(12) United States Patent
Palackal et al.

(10) Patent No.: US 8,324,330 B2
(45) Date of Patent: Dec. 4, 2012

(54) PROCESS FOR THE PREPARATION OF A SILYLCHROMATE CATALYST

(75) Inventors: Syriac Palackal, Riyadh (SA); Srikant Hazra, Riyadh (SA); Orass Hamed, Riyadh (SA); Mohammed Al-Anazi, Riyadh (SA)

(73) Assignee: Saudi Basic Industires Corporation, Riyadh (SA)

( * ) Notice: Subject to any disclaimer, the term of this patent is extended or adjusted under 35 U.S.C. 154(b) by 323 days.

(21) Appl. No.: 12/224,760

(22) PCT Filed: Mar. 29, 2007

(86) PCT No.: PCT/EP2007/002775
§ 371 (c)(1),
(2), (4) Date: Feb. 23, 2009

(87) PCT Pub. No.: WO2007/112919
PCT Pub. Date: Oct. 11, 2007

(65) Prior Publication Data
US 2009/0306317 A1    Dec. 10, 2009

(30) Foreign Application Priority Data
Mar. 31, 2006    (EP) .................................. 06006913

(51) Int. Cl.
*C08F 4/06*    (2006.01)
*B01J 31/00*    (2006.01)
*B01J 21/00*    (2006.01)
(52) U.S. Cl. .................. 526/126; 502/158; 502/256
(58) Field of Classification Search .............. 526/129; 502/158, 256
See application file for complete search history.

(56) References Cited

U.S. PATENT DOCUMENTS

| 3,324,095 A | 6/1967 | Carrick et al. |
| 3,704,287 A | 11/1972 | Johnson |
| 5,137,994 A | 8/1992 | Goode et al. |

FOREIGN PATENT DOCUMENTS

| EP | 0931797 A1 | 4/1997 |
| WO | WO 2004/094489 A1 | 11/2004 |
| WO | WO 2007/112919 A1 | 10/2007 |

OTHER PUBLICATIONS

International Search Report; International Application No. PCT/EP2007/002775; International Filing Date: Mar. 29, 2007; Date of Mailing: Jun. 12, 2007; 3 Pages.
Written Opinion of the International Searcing Authority; International Application No. PCT/EP2007/002775; International Filing Date: Mar. 29, 2007; Date of Mailing: Jun. 12, 2007; 5 Pages.

*Primary Examiner* — Ling Choi
*Assistant Examiner* — Monique Peets
(74) *Attorney, Agent, or Firm* — Cantor Colburn LLP

(57) ABSTRACT

The invention is directed to a process for the preparation of a silylchromate catalyst comprising the steps of:
1. depositing silylchromate on a support at a deposition temperature of at least 55° C. during a deposition time of less than 6 hours,
2. reducing the supported silylchromate by addition of a reducing agent at a reduction temperature of at least 15° C. during a reduction time of less than 1.5 hours; and
3. drying of the reduced silylchromate at a temperature of at least 25° C. during a drying time of less than 8 hours.

The invention also relates to a process for the production of an ethylene homopolymer or an ethylene copolymer in the presence of the silylchromate catalyst obtained with the process according to the invention.

10 Claims, No Drawings

PROCESS FOR THE PREPARATION OF A SILYLCHROMATE CATALYST

The present invention relates to a process for the preparation of a silylchromate catalyst.

The invention also relates to a process for the homopolymerization of ethylene and to a process for the copolymerization of ethylene in the presence of the silylchromate catalyst.

U.S. Pat. No. 5,137,994 discloses a process for the preparation of a silylchromate catalyst and discloses a process for the copolymerization of ethylene and 1-hexene in the presence of the silylchromate catalyst system comprising the supported reaction product of a bis-hydrocarbylsilyl chromate and a hydrocarbylaluminum compound. The process for preparing a silylchromate catalyst according to U.S. Pat. No. 5,137,994 is a three step process. In the first step silylchromate on a support is deposited, in the second step reduction of the chromium of the deposited catalyst takes place and thereafter drying of the catalyst takes place. The silylchromate is at first deposited on silica at a temperature of 45° C. during 10 hours. Subsequently, an alkyl aluminum for example triisobutylaluminum or diethylaluminumethoxide is added at a temperature of 45° C. and the mixture is agitated during two hours. Finally, the supported silylchromate catalyst is dried at a temperature of 70° C. during 10 hours.

It is a disadvantage of the silylchromate based catalysts obtained with the three step process according to U.S. Pat. No. 5,137,994 that the productivity (g PE/g catalyst) during the polymerization of ethylene is relatively low.

It is an object of the present invention to provide a silylchromate catalyst which results in a higher productivity of the ethylene polymerization.

This object is achieved by a process for the preparation of a silylchromate catalyst comprising the steps of
1. depositing silylchromate on a support at a deposition temperature of at least 55° C. during a deposition time of less than 6 hours,
2. reducing the supported silylchromate by addition of a reducing agent at a reduction temperature of at least 15° C. during a reduction time of less than 1.5 hours and
3. drying of the reduced silylchromate at a temperature of at least 25° C. during a drying time of less than 8 hours.

The process according to the invention results in a significantly reduced preparation time of the process to prepare the silylchromate catalyst by the combination of increasing the deposition temperature, the reduction temperature and the drying temperature and decreasing the deposition time, the reduction time and the drying time.

The process according to the invention results in an increased productivity of the ethylene polymerization.

Furthermore the process according to the invention is easy and fast.

The process according to the invention takes advantage of the increased reaction kinetics at elevated temperatures. Furthermore this process avoids the increase of decomposition of the catalyst at these higher temperatures. It is an advantage of the present invention that the combination of these features results in a significant increase of the productivity.

The process according to the present invention results in silylchromates such as for example bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate and bis-adamantyl chromate.

A preferred silylchromate is bis-triphenyl silylchromate.

Preferably, the step of depositing silylchromate on a support takes place at a deposition temperature of at least 60° C.

More preferably, the step of depositing silylchromate on a support takes place at a deposition temperature of at least 65° C.

Preferably, the step of depositing silylchromate on a support takes place during a deposition time of less than 5 hours. Generally the deposition time ranges between 0.5 and 5 hours Preferably the step of reducing the supported silylchromate by addition of a reducing agent takes place at a reduction temperature of at least 55° C.

More preferably the step of reducing the supported silylchromate by addition of a reducing agent takes place at a reduction temperature of at least 60° C.

Preferably the step of reducing the supported silylchromate by addition of a reducing agent takes place during a reduction time of less than 1 hour. Generally the reduction time ranges between 0.5 and 1.5 hours.

Preferably the step of drying of the reduced silylchromate takes place at a temperature of at least 75° C.

More preferably the step of drying of the reduced silylchromate takes place at a temperature of at least 80° C.

Preferably the step of drying of the reduced silylchromate takes place during a drying time of less than 5 hours.

Preferably the drying time ranges between 0.5 and 5 hours.

Generally the deposition temperature, the reduction temperature and the drying temperature are less than 100° C.

According to a preferred embodiment of the invention the process for the preparation of a silylchromate catalyst comprising the steps of:
1. depositing silylchromate on a support at a deposition temperature of at least 55° C. during a deposition time of less than 6 hours,
2. reducing the supported silylchromate by addition of a reducing agent at a reduction temperature of at least 55° C. during a reduction time of less than 1.5 hours and
3. drying of the reduced silylchromate at a temperature of at least 75° C. during a drying time of less than 8 hours.

Suitable supports include for example inorganic supports. Suitable inorganic supports include for example silica, dehydrated silica, alumina, aluminium phosphate and/or modified silica such as for example silica modified with an organo aluminum compound.

A suitable silica includes for example ES 70 silica of Ineos.

Preferably the support is a dehydrated inorganic support.

According to a preferred embodiment of the invention the support is dehydrated silica.

Suitable reducing agents include for example hydrocarbylaluminum compounds and hydrocarbylboron compounds Suitable hydrocarbylaluminum compounds are for instance trihydrocarbylaluminum compounds, hydrocarbylaluminum halide, hydrocarbylaluminum hydrocarbyloxide and/or hydrocarbylaluminum hydride. The hydrocarbyl group may contain for example between 1 and 14 carbon atoms for example ($C_1$-$C_{14}$) alkyl, aralkyl, aryl, alkaryl, alicyclic, or bicyclic group. The halogen in the hydrocarbylaluminum halide may be chlorine, bromine, fluorine and iodine. Examples of suitable hydrocarbyl aluminum compounds are trimethyl aluminum, triethyl aluminum, triisobutyl aluminum, triisopropyl aluminum, tridecyl aluminum, tridodecyl aluminum, diethyl aluminum chloride, dibutyl aluminum chloride, dibutyl aluminum bromide, dibutyl aluminum iodide, dibutyl aluminum fluoride, dihexylaluminum chloride, methylaluminum dichloride, ethyl aluminum dibromide, butylaluminum dichloride, pentyl aluminum dichloride, diethyl aluminum hydride, dibutyl aluminum hydride, dihexyl aluminum hydride, methyl aluminum dihydride, ethyl aluminum dihydride, butyl aluminum dihydride and/or pentyl aluminum dihydride.

Suitable hydrocarbylboron compounds may have the general formula $BR_3$ wherein R may be a hydrocarbyl group having for example 1 to 14 carbon atoms. Suitable examples include trimethylborane, triethylborane, triisobutylborane, and tributylborane.

According to a preferred embodiment of the invention the reducing agent is a hydrocarbylaluminum hydrocarbyloxide. (These compounds are also indicated as "alkylaluminum alkoxide".)

Alkylaluminum alkoxides are compounds having the general formula $R_nAl(OR)_{3-n}$ wherein n is an integer from 1 to 2, and R may a hydrocarbyl group. The hydrocarbyl group has for example 1 to 14 carbon atoms. The hydrocarbyl group may be alkyl, aralkyl, aryl, alkaryl, alicyclic or bicyclic. Examples are methyl, ethyl, propyl, iso-propyl, n-butyl, iso-butyl, n-pentyl, iso-pentyl, t-pentyl, hexyl, cyclohexyl, 2-methyl-pentyl, heptyl, octyl, 2-ethylhexyl, cyclohexylmethyl, nonyl, decyl undecyl, dodecyl, tridecyl, tetradecyl, benzyl, pinyl, pinylmethyl, phenethyl. p-methybenzyl, phenyl, tolyl, xylyl, naphthyl, ethylphenyl, methynaphthyl, dimethylnaphthyl, norborynyl and/or norbornyl methyl.

Compounds containing two or more Al atoms linked to each other through hetero-atoms and aluminum alkyl compounds in which Al atoms are linked through groups such as $SO_4$ or $SO_3$ are also suitable. The aluminium alkyl compounds may be used in mixture with Al-alkyl halides.

According to a further preferred embodiment of the invention the alkyl aluminum alkoxide is diethylaluminum ethoxide The deposition of silylchromate on the support and/or the reduction of the supported silylchromate are preferably carried out in a hydrocarbon solvent such as for example isopentane.

According to a preferred embodiment of the invention the present catalyst is used in ethylene homo and copolymerization. The catalysts are very suitable to be applied in the production of HDPE. The polymerization can take place for example via gas phase technology, slurry vessel technology and slurry loop technology. The obtained polymer can be used for example in film and in pipe applications.

The invention will be elucidated with the following non-restrictive examples.

EXAMPLE I 530 g silica (ES70 of Ineos) dehydrated at 600° C. for 4 hours under nitrogen was added to a reactor substantially free of air and moisture. 18.5 g bis-triphenysilylchromate was added to it followed by 2100 g isopentane. The reaction mixture was stirred at 60° C. for 5 hours and 13.7 ml neat diethylaluminumethoxide was then added. The slurry was stirred for 1 hour at 60° C. and subsequently reactor vent was opened to remove isopentane simultaneously increasing the temperature to 75° C. The heating was continued for 5 hours. The reactor was then cooled to room temperature and the product discharged into a sample cylinder.

EXAMPLE II 530 g ES70 silica dehydrated at 600° C. for 4 hours under nitrogen was added to a reactor substantially free of air and moisture. 18.7 g bis-triphenysilylchromate was added to it followed by 2100 g isopentane. The reaction mixture was stirred at 60° C. for 5 hours and 13.7 ml neat diethylaluminumethoxide was then added. The slurry was stirred for 1 hour at 60° C. and subsequently the reactor vent was opened to remove isopentane simultaneously increasing the temperature to 80° C. The heating was continued for 5 hours. The reactor was then cooled to room temperature and the product discharged into a sample cylinder.

EXAMPLE III 455 g ES70 silica dehydrated at 600° C. for 4 hours under nitrogen was added to a reactor substantially free of air and moisture. 15.9 g bis-triphenysilylchromate was added to it followed by 1800 g isopentane. The reaction mixture was stirred at 60° C. for 5 hours and 11.6 ml neat diethylaluminumethoxide was then added. The slurry was stirred for 1 hour at 60° C. and subsequently reactor vent was opened to remove isopentane simultaneously increasing the temperature to 85° C. The heating was continued for 5 hours. The reactor was then cooled to room temperature and the product discharged into a sample cylinder.

COMPARATIVE EXAMPLE A 550 g ES70 silica dehydrated at 600° C. for 4 hours under nitrogen was added to a reactor substantially free of air and moisture. 16.6 g bis-triphenysilylchromate was added to it followed by 2200 g isopentane. The reaction mixture was stirred at 45° C. for 10 hours and 12.2 ml neat diethylaluminumethoxide was then added. The slurry was stirred for 2 hours at 45° C. and subsequently reactor vent was opened to remove isopentane simultaneously increasing the temperature to 75° C. The heating was continued for 10 hours. The reactor was then cooled to room temperature and the product discharged into a sample cylinder.

COMPARATIVE EXAMPLE B 570 g ES70 silica dehydrated at 600° C. for 4 hours under nitrogen was added to a reactor substantially free of air and moisture. 19.9 g bis-triphenysilylchromate was added to it followed by 2300 g isopentane. The reaction mixture was stirred at 55° C. for 5 hours and 14.5 ml neat diethylaluminumethoxide was then added. The slurry was stirred for 1 hour at 55° C. and subsequently reactor vent was opened to remove isopentane simultaneously increasing the temperature to 75° C. The heating was continued for 9 hours. The reactor was then cooled to room temperature and the product discharged into a sample cylinder.

COMPARATIVE EXAMPLE C 525 g ES70 silica dehydrated at 600° C. for 4 hours under nitrogen was added to a reactor substantially free of air and moisture. 18.3 g bis-triphenysilylchromate was added to it followed by 2100 g isopentane. The reaction mixture was stirred at 60° C. for 5 hours and 13.3 ml neat diethylaluminumethoxide was then added. The slurry was stirred for 1 hour at 60° C. and subsequently reactor vent was opened to remove isopentane simultaneously increasing the temperature to 75° C. The heating was continued for 9 hours. The reactor was then cooled to room temperature and the product discharged into a sample cylinder.

Table 1 gives an overview of the deposition, reduction and drying times and temperatures. The ratio Si:Al is constant.

TABLE 1

| Example | Deposition Temp. (°C.) | Deposition Time. (h) | Reduction Temp. (°C.) | Reduction. Time (h) | Drying Temp. (°C.) | Drying Time (h) | Al:Cr (measured) |
|---|---|---|---|---|---|---|---|
| I | 60 | 5 | 60 | 1 | 75 | 5 | 3.2 |
| II | 60 | 5 | 60 | 1 | 80 | 5 | 3.1 |
| III | 60 | 5 | 60 | 1 | 85 | 5 | 3.2 |
| A | 45 | 10 | 45 | 2 | 75 | 9 | 2.5 |
| B | 55 | 5 | 55 | 1 | 75 | 9 | 2.7 |
| C | 60 | 5 | 60 | 1 | 75 | 9 | 3.2 |

The catalysts according to the Examples I-III and the Comparative Examples A-C were used in a gas phase process at a temperature of 106° C. for the production of high density polyethylene (HDPE) having a flow index of 8-9 dg/min and a density of 952-954 kg/m$^3$.

TABLE 2

| Use of catalyst | Productivity (g PE/g Cat) | Mw | Mn | MWD |
|---|---|---|---|---|
| I | 5047 | 310,920 | 12,960 | 23.9 |
| II | 4938 | 288,756 | 13,123 | 22.0 |
| III | 4858 | 304,290 | 12838 | 23.7 |
| A | 2700 | 384,251 | 14683 | 26.2 |
| B | 2340 | 319,816 | 13,800 | 23.1 |
| C | 2508 | 310,562 | 13,196 | 23.5 |

Table 2 shows that a substantial improvement in productivity is obtained by use of the catalysts I-III obtained with the process according to the invention.

Examples I-III show that the decreasing of the drying time significantly increases the productivity.

The polymer obtained was blended with stabilizer package and pelletized using a ZSK-58 extruder at a fixed screw speed of 110 RPM, melt pressure ranging from 122 up to 137 bar, and a cutter speed ranging between 550 to 700 RPM. The results of the gel permetation chromatography (GPC) analysis of the pellets are summarized in Table 2.

The pelletized samples were then used to produce blown films using a Kiefel line, and a fixed output of 100 kg/h, screw speed 89-90 RPM, amperage 88-94 and frost line height 104-120 mm to produce 10 mm of film thickness.

Although, there is slight narrowing of the molecular weight distribution (MWD), the products obtained with the catalysts obtained with the process according to the present invention exhibited excellent bubble stability during film blowing.

The invention claimed is:

1. A process for the preparation of a silylchromate catalyst comprising:
depositing silylchromate on a support at a deposition temperature of at least 55° C. during a deposition time of less than 6 hours,
reducing the supported silylchromate by addition of a reducing agent at a reduction temperature of at least 55° C. during a reduction time of less than 1.5 hours and
drying of the reduced silylchromate at a temperature of at least 75° C. during a drying time of less than 8 hours.

2. The process according to claim 1, wherein the step of depositing silylchromate on the support takes place at a deposition temperature of at least 60° C.

3. The process according to claim 1 wherein the step of depositing silylchromate on the support takes place at a deposition temperature during a deposition time of less than 5 hours.

4. The process according to claim 1 wherein the step of reducing the supported silylchromate by addition of a reducing agent takes place at a reduction temperature of at least 55° C.

5. The process according to claim 1 wherein the step of reducing the supported silylchromate by addition of a reducing agent takes place during a reduction time of less than 1 hour.

6. The process according to claim 1 wherein the step of drying of the reduced silylchromate takes place during a drying time of less than 5 hours.

7. The process according to claim 1 wherein the deposition temperature, the reduction temperature and the drying temperature are less than 100° C.

8. The process according to claim 1 wherein the support is silica, dehydrated silica, alumina, aluminium phosphate and/or modified silica.

9. The process according to claim 1 wherein the reducing agent is a trihydrocarbylaluminum compound, a hydrocarbylaluminum halide, a hydrocarbylaluminum hydrocarbyloxide and/or a hydrocarbylaluminum hydride.

10. A polymerization process for the production of an ethylene homopolymer or copolymer comprising polymerization in the presence of a silylchromate catalyst obtained with a process comprising:
depositing silylchromate on a support at a deposition temperature of at least 55° C. during a deposition time of less than 6 hours,
reducing the supported silylchromate by addition of a reducing agent at a reduction temperature of at least 55° C. during a reduction time of less than 1.5 hours; and
drying of the reduced silylchromate at a temperature of at least 75° C. during a drying time of less than 8 hours.

* * * * *